May 6, 1958   W. P. OEHLER ET AL   2,833,197
ATTACHMENT FRAME FOR TRACTOR PLANTERS
Original Filed March 22, 1950   3 Sheets-Sheet 1

INVENTORS.
WILLIAM P. OEHLER
CHARLES H. YOUNGBERG
BY
ATTORNEYS

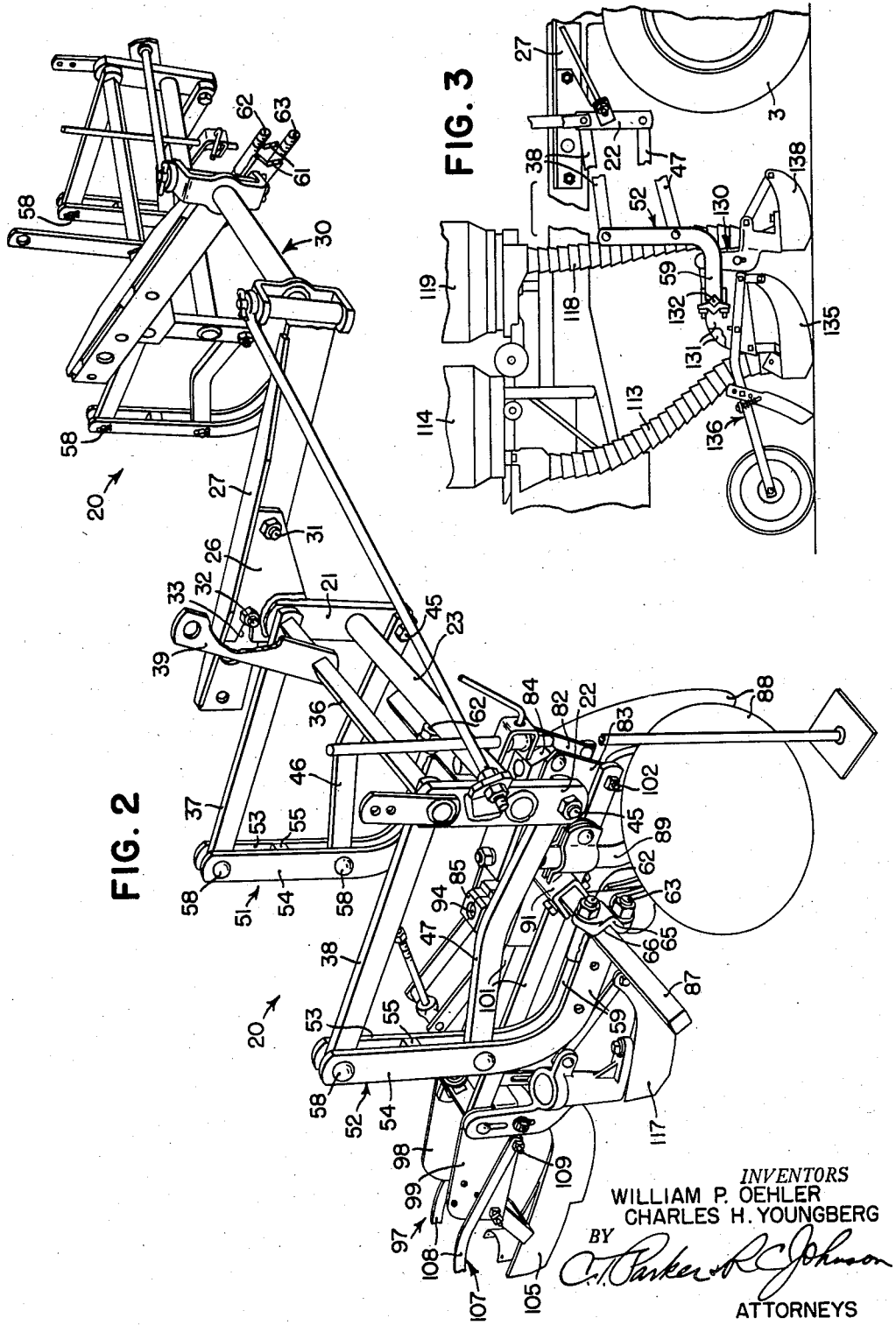
May 6, 1958 — W. P. OEHLER ET AL — 2,833,197
ATTACHMENT FRAME FOR TRACTOR PLANTERS
Original Filed March 22, 1950 — 3 Sheets-Sheet 2
INVENTORS
WILLIAM P. OEHLER
CHARLES H. YOUNGBERG
ATTORNEYS May 6, 1958  W. P. OEHLER ET AL  2,833,197
ATTACHMENT FRAME FOR TRACTOR PLANTERS
Original Filed March 22, 1950  3 Sheets-Sheet 3

INVENTORS
WILLIAM P. OEHLER
CHARLES H. YOUNGBERG
BY
ATTORNEYS

United States Patent Office 2,833,197
Patented May 6, 1958

2,833,197
ATTACHMENT FRAME FOR TRACTOR PLANTERS

William P. Oehler and Charles H. Youngberg, Moline, Ill., assignors to Deere & Company, Moline, Ill., a corporation of Illinois Continuation of application Serial No. 151,276, March 22, 1950. This application November 9, 1953, Serial No. 390,848

4 Claims. (Cl. 97—47.62)

This application is a continuation of our copending application Ser. No. 151,276, filed March 22, 1950, now abandoned.

The present invention relates generally to agricultural machines and more particularly to planters and other implements having ground-working units, especially those adapted to be mounted on a farm tractor.

The object and general nature of the present invention is the provision of a new and improved attachment frame for connecting planting and/or fertilizing units with a tractor, and more particularly it is a feature of the present invention to provide an attachment frame in which different kinds of ground-working units may readily be accommodated.

More specifically, it is a feature of this invention to provide a simple, sturdy and inexpensive attachment frame, whereby planting units of different kinds may readily be attached to or disconnected from a tractor, whereby the down time for the tractor, required for changing implements and the like in shifting the tractor from one service to another, is substantially reduced. Still further, another feature of this invention is the provision of a planter attachment frame having reversible standards whereby units requiring a well forward position of mounting may be accommodated and, likewise, by reversing the standards, units requiring a more rearward mounting are also accommodated.

These and other objects and advantages of this invention will be apparent to those skilled in the art after a consideration of the following detailed description, taken in conjunction with the accompanying drawings, in which:

Figure 1 is a side view, showing the principles of the present invention as incorporated in a two-row, tractor-mounted planter having ground-working units which include a forwardly mounted furrow opening means and planting and fertilizer furrow opeing means floatingly connected with the forwardly arranged furrow opening means and disposed a substantial distance rearwardly therefrom, which is best accommodated by one of the two possible arrangements of the attachment frame, according to the principles of the present invention.

Figure 2 is a perspective view of the planter frame attachment, detached from the tractor and arranged to receive ground-working units of the type shown in Figure 1.

Figure 3 is a side view similar to Figure 1 but showing the attachment frame arranged to receive another type of ground-working unit, namely, one in which the seed furrow opener is connected directly with the attachment frame.

Figure 1:
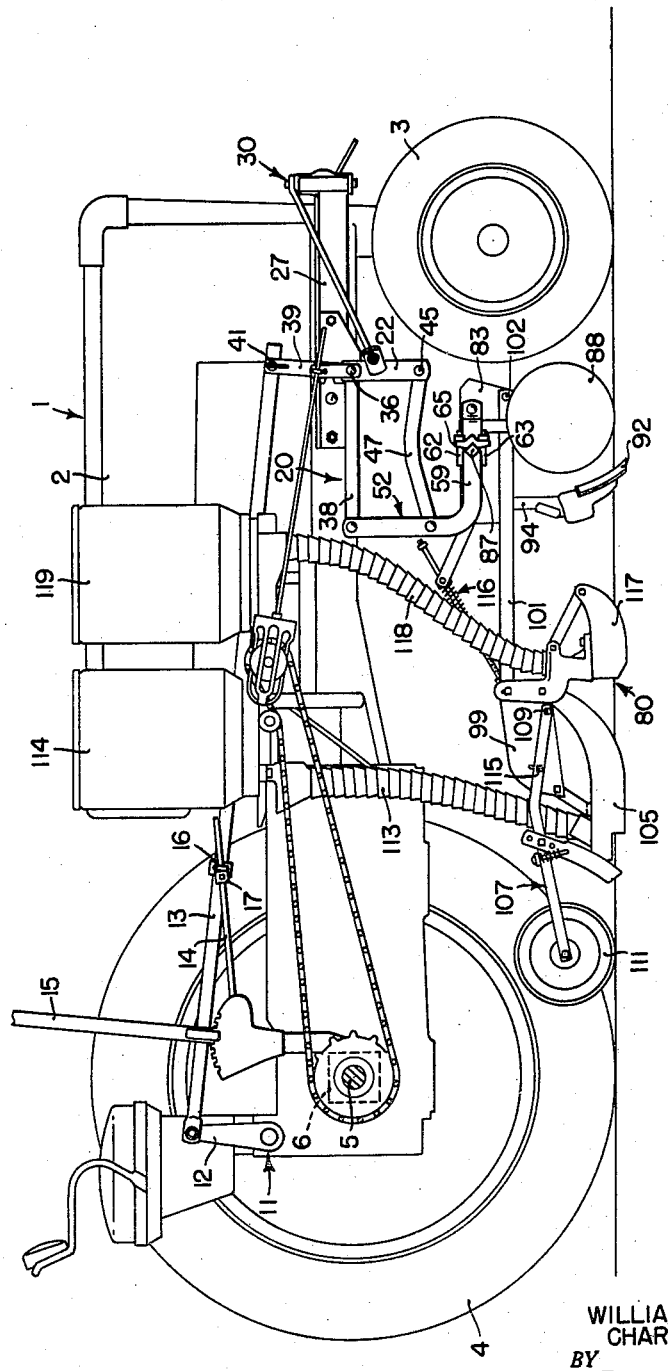

Referring now to the drawings, particularly Figures 1-3, the tractor on which the new improved attachment frame is mounted is indicated in its entirety by the reference numeral 1 and is of the well-known three-wheel or tricycle type, including a narrow body 2, front wheel means 3 and laterally spaced rear or traction wheels 4 fixed to axles 5 that are journaled for rotation in rear axle extensions 6. Also, the tractor 1 includes a power lift unit 11 connected with the tractor motor so as to be driven therefrom and arranged to act through power lift arms 12 or the like for raising and lowering implements, as by the use of a generally fore and aft extending push pipe 13, one disposed at each side of the tractor and each connected at its rear end with one of the power lift arms 12 to be actuated thereby, preferably being moved forwardly when the power lift unit is actuated to raise the implements. The rearward movement of each of the lift pipes 13 is limited by means of a stop link 14 connected at its rear end to a hand lever 15 and extending at its forward portion through a part 16 in the form of an apertured abutment against which an adjustable set screw collar 17 acts to limit the rearward movement of the associated lift pipe 13. The construction described so far is conventional, so far as the present invention is concerned.

The planter attachment frame with which the present invention is more particularly concerned, is indicated in its entirety by the reference numeral 20, there being one of such attachment frames at each side of the tractor, as best shown in Figure 2. Each attachment frame 20 includes a pair of brackets 21 and 22 normally disposed in vertical planes and arranged in spaced-apart relation, and a transverse member 23 which is rigidly secured, as by welding, at its ends to the inner and outer brackets 21 and 22, preferably between the ends of the latter parts. Secured to the upper portion of the laterally inner bracket 21 is an attaching plate 26 which preferably is welded or otherwise rigidly and permanently fixed to the bracket 21. The supporting plate 26 is adapted to be connected by any suitable means to a frame member 27 which is adapted to be detachably connected with the side of the tractor. The bar 27 forms a part of an articulated frame structure 30 which is generally of the type shown and claimed in U. S. Patent Re. 23,154, dated October 11, 1949, to which reference may be had if necessary. Preferably, the plate 26 is adapted to be connected to the frame bar 27 by means of a pair of bolts 31 and 32, one passing through an aperture in the forward end of the plate 26 and the other passing through a slot 33, the slot extending to a point substantially directly over the inner end of the transverse member 23 and thereby facilitating the convenient temporary support of the frame unit on the bar 27, when mounting the attachment frame on the frame bar 27.

The upper ends of the brackets 21 and 22 are apertured to rockably receive the end portions of a transverse rockshaft 36. Arms 37 and 38 are rigidly fixed, as by welding, at their forward ends to the ends of the rockshaft 36, and a lifting arm 39 is also rigidly fixed, as by welding, to the rockshaft 36. The outer end of the lift arm 39 is apertured to receive a quick-detachable pin 41 by which the front end of the tractor lift pipe at that side of the tractor may be connected to the arm 39. The lower ends of the brackets 21 and 22 are apertured to receive pivots 45 by which the forward ends of a pair of lower links 46 and 47 are connected to the brackets for generally vertical swinging.

Pivotally connected to the rear ends of the upper arms 37 and 38 and the lower links 46 and 47 are two generally vertically disposed standards 51 and 52. These standards are substantially identical, and each consists of two bars 53 and 54 connected together in spaced-apart relation by lugs 55 to which the vertical portions of the standards are welded, the arms 37 and 38 and the lower links 46 and 47 being disposed between the vertical portions of the standards. Pivots 58 connect the upper portions of the standards 51 and 52 to the rear ends of the arms 37 and 38 and the links 46 and 47. At their lower portions the bars 53 and 54 are bent or shaped to have horizontal extensions 59 which may be arranged to extend either forwardly or rearwardly, according to the type of tools to be connected thereto. To this end, the pivots 58 are of the quick-detachable variety and the apertures in the vertical portions 53 and 54 of the standards are substantially midway between the front and rear edges. The outer end portions of the horizontal extensions 59 are provided with horizontally facing V-shaped notches 61, and the outer ends of these parts are provided with horizontally extending, upper and lower studs 62 and 63 that are threaded at their outer ends. The welding of the studs to the horizontal extensions 59 provides additional means for holding the standard bars in spaced-apart relation. The outer ends of the studs 62 and 63 are threaded and are adapted to extend through openings formed in a clamping cap 65 having a V-shaped notched portion 66 complementary with respect to the notch 61 in the ends of the associated standard bars.

The attachment frame structure just described is adapted to be used to support planting and fertilizing units which may be of either of two types. The unit shown in Figure 1 is of the type which includes a forward mounted furrow opener means and planting and fertilizer furrow opener means disposed rearwardly a substantial distance therefrom and floatingly connected with the forward furrow opener means. The present invention is not especially concerned with the particular details of the ground-working unit or units adapted to be attached to the attachment frames 20. Preferably, each of the types of ground-working units particularly adapted to be mounted on each carriage frame 20 includes a laterally extending spread bar that is adapted to be rigidly clamped by the caps 65 to the outer end portions of the horizontal standard extensions 59. One type of ground-working unit, which requires a forward disposition of the horizontal standard extensions 59, is shown by way of illustration in Fig. 1, and referring now to that figure it will be seen that this type of ground-working unit, indicated in its entirety by the reference numeral 80, includes a pair of supporting plates 82, 83 which are fixed together in closely spaced relation by front and rear shank-receiving socket castings 84 and 85 to which the plates 82 and 83 are rigidly bolted. The support plates 82 and 83 are apertured to receive a laterally extending spread bar 87 which preferably is welded to one or both of the plates 82 and 83 and, as mentioned above, the spread bar 87 is adapted to be clamped to the forward ends of the horizontal standard sections 59. When the unit 80 is arranged to form furrows, a pair of disks 88 are rotatably connected to the lower ends of a pair of standards 89 which at their upper ends are adapted to be connected by clamps 91 to the spread bar on opposite sides of the support plates 82 and 83, the disks 88 being set so as to open a furrow. Rearwardly of the furrow-opening disks 88 is a centrally disposed ground-working tool in the form of a shovel 92 carried by suitable means at the lower end of a tool shank 94 that is fixed in the rear socket casting.

A planter runner frame 97 includes a pair of rear support plates 98 and 99, and connected thereto is a pair of forwardly extending runner frame bars 101 which are pivotally connected at their forward ends, as at 102, to the forward portions of the furrow opener support plates 82 and 83. A seed furrow opener 105, preferably in the form of a runner, is fixed by any suitable means to the runner frame supporting plates 98 and 99, and a press wheel frame 107, comprising right- and left-hand press wheel frame bars 108, is pivotally connected, at 109, to the plates 98 and 99. The frame 107 carries rear press wheels 111. Seed is delivered to the runner opener 105 through a seed tube 113 which extends from the runner 105 substantially directly upwardly to the seed dispensing mechanism of the seed hopper 114 carried at that side of the tractor. The press wheel frame bars 108 may be fixed rigidly to the support plates 98 and 99 by means of clamping bolts 115. However, the bolts 115 may be loosened, when desired, to permit the press wheel frame to float. A spring pressure device 116 is connected between the furrow opener support plates 82 and 83 and the runner frame support plates 98 and 99, and the unit 116 may be arranged to apply either downward pressure or upward pressure, as desired. The unit 80 may also be provided with a fertilizer furrow opener 117, and a fertilizer tube 118 may be connected between the unit 117 and a fertilizer hopper 119 also carried by suitable means on the tractor.

It will be noted that in this form of ground-working unit, the depth-adjusting mechanism of the tractor power lift, acting through the rockshaft 36 and the arms 37 and 38, serves to control the depth of the furrow-opening disk 88, while the planter runner frame and associated parts are vertically swingable relative to the disk furrow opener frame plates 82 and 83 through the relatively long runner frame bars 101. Therefore, in order to have the runner opener 105 and the fertilizer furrow opener 117 disposed substantially directly underneath the seed hopper 114 and the fertilizer hopper 119, the standards 51 and 52 are arranged with the horizontal extensions 59 extending forwardly, thereby disposing the spread bar 87 in a forwardmost position.

For ground-working units which are relatively short in a fore and aft direction, it is preferable to reverse the standards 51 and 52 so as to have the extensions 59 disposed rearwardly, rather than in a forward position as described above. The latter form of ground-working unit has been shown in Figure 3, and referring now to this figure, this ground-working unit is indicated in its entirety by the reference numeral 130 and includes a pair of laterally spaced runner frame plates 131 to which a spread bar 132, which may be the same as the spread bar 87 mentioned above, is rigidly connected by any suitable means, preferably located at the generally central portion of the spread bar 132. A seed furrow opener in the form of a runner 135 is fixed in any suitable way to the support plates 131, and a press wheel unit 136, which may be the same as described above, is connected with the plates 131. Also, this type of unit may have a fertilizer furrow opener 138 fixed to the outermost frame plate 131. Since this unit 130 is relatively short in a fore and aft direction, it is preferable, as described above, to have the standard extensions 59 disposed rearwardly, the spread bar 132 of the unit 130 being fixed in the ends of the standard extensions 59 by the clamping caps 65. This disposes the seed and fertilizer furrow openers 135 and 138 substantially underneath the seed and fertilizer hoppers 114 and 119 so that the tubes 113 and 118 extending therefrom, respectively, lead directly downwardly to the opener 135 and 138 and thereby provide for the relatively free downward movement of the seed and fertilizer.

The attachment frames 20 as described above, when one is mounted on each side of the tractor by the quick-detachable frame unit 30, provide a two-row machine. However, the present invention may with substantially equal facility be incorporated in a four-row machine, thereby providing for the convenient use of either of the two above mentioned types of ground-working units in a four-row machine.

Figures 4, 5:
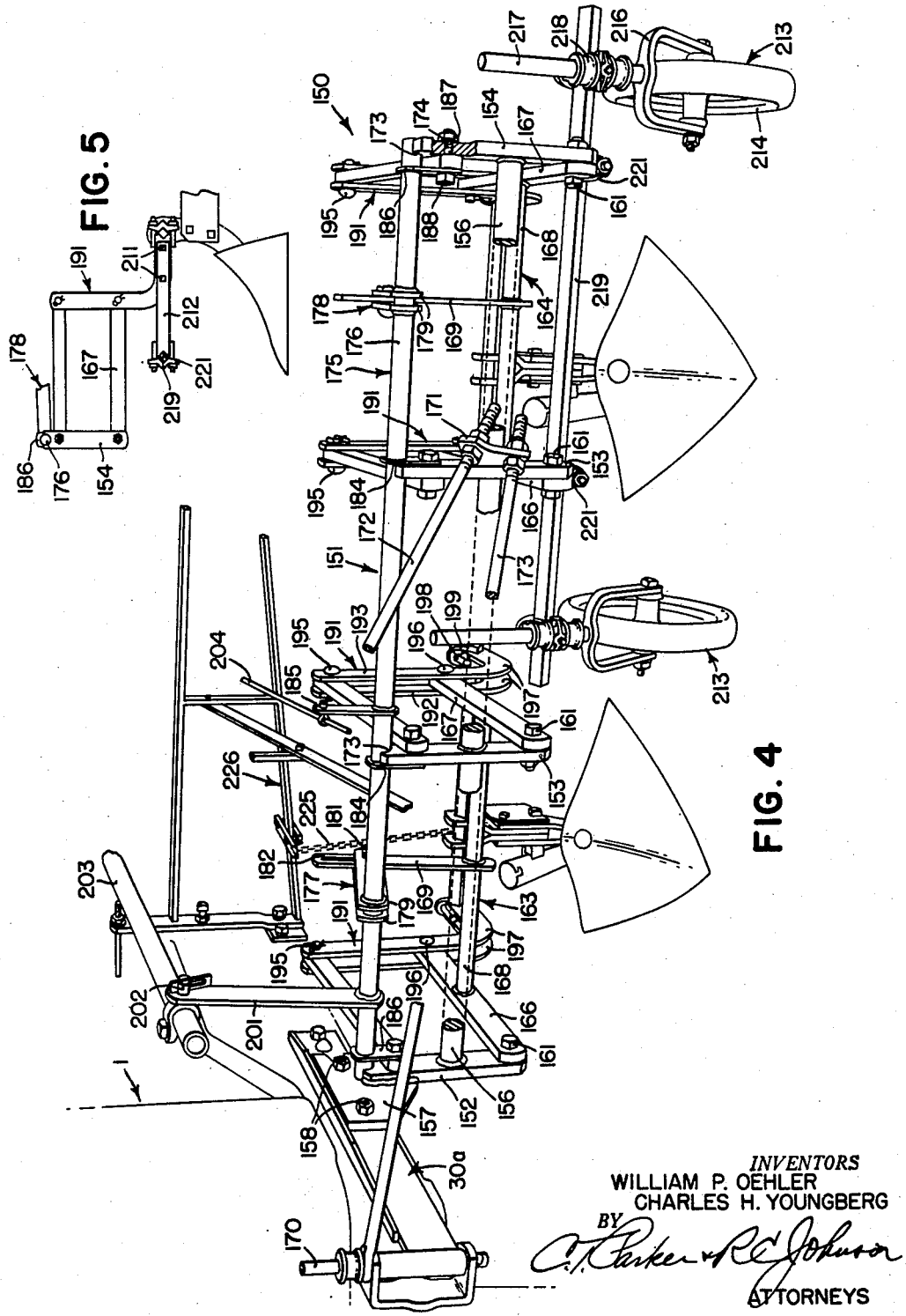
Figure 4 is a perspective view of an attachment frame incorporating the principles of the present invention and adapted and constructed for four-row operation.
Figure 5 is a side view of the attachment frame and associated parts shown in Figure 4.

Referring now to Figure 4, the attachment frame construction for a four-row outfit comprises right- and left-hand attachment frames, each of which is indicated in its entirety by the reference numeral 150, and since the attachment frames are identical, except parts may be right-hand or left-hand, as desired, a detailed description of one of the frames 150 will suffice. Each unit 150 includes a supporting frame structure 151 which includes a generally vertically disposed inner bracket 152, intermediate brackets 153 and an outer bracket 154. The several brackets are rigidly connected together by a relatively heavy bar 156 to which the intermediate portions of the several brackets 152—154 are rigidly connected, as by welding. Secured to the upper portion of the laterally innermost bracket 152 is an attachment plate 157 which is apertured at its front and rear portions to receive bolts or studs 158 which are arranged to fix the associated frame structure 151 to a quick-detachable frame structure 30a which may be substantially the same as the articulated tractor-carried frame 30 mentioned above. Preferably, the aperture in the plate 157 receiving the rear stud 158 is slotted, similarly to the slot 33 in the plate 26, shown in Figure 1. The lower end of each of the brackets 152—154 is apertured to receive a pivot member 161 by which the associated portion of two rigid lift units 163 and 164 is pivoted thereto. The rigid units 163 and 164 are substantially identical, each comprising a pair of arms 166 and 167 rigidly interconnected by means of a crossbar 168, the ends of which are rigidly secured, as by welding, to the intermediate or central portions of the arms 166 and 167. Before the parts are welded together the lower apertured end of a lifting link 169 is placed over the transverse bar 168. The forward ends of the rigidly interconnected arms 166 and 167 are pivotally connected by means of the above mentioned pivots 161 to the associated brackets, the unit 163 being connected to the inner pair of brackets 152, 153 and the laterally outer rigid unit 164 being pivotally connected to the outer pair of brackets 153, 154. A brace rod bracket 171 is fixed, as by welding, to the support bar 156 closely adjacent the laterally outer intermediate bracket 153, the brace rod bracket 171 being apertured to receive a pair of brace rods 172 and 173 which at their inner ends are connected to upper and lower portions of a vertical bar 170 that forms a part of the articulated quick-detachable frame 30a.

The upper end of each of the brackets 152–154 is provided with an upwardly facing, generally semi-circular socket 173, and a short distance below the socket each of the brackets is provided with a tapped opening 174. Rockably mounted in the several sockets 173 is a rockshaft unit 175 which includes a rockshaft 176 of substantially the same length as the transverse support bar 156 and a pair of lifting arms 177 and 178, each of which includes a pair of spaced-apart members 179 welded at their inner ends to the rockshaft 176. The members 179 are spaced apart so as to receive the upper ends of the lifting links 169, the outer ends of the members 179 being apertured to receive pivots 181 by which the lifter links 169 are connected thereto. Preferably, the upper ends of the lift links are slotted, as at 182, so as to provide for a limited amount of up and down movement of the lifter units 163 and 164 relative to one another and relative to the lift arms 177 and 178. Before the parts constituting the rockshaft unit 175 are welded together, apertured straps 184 are placed on the shaft 176 between the lift arms 177 and 178, and a clutch-controlling arm 185 is also placed on the shaft 176, and then the lift arms 177 and 178 and the clutch-controlling arm 185 are welded to the shaft 176. The latter is of such length as to be disposable in the sockets 173 of the several brackets 152—154, and auxiliary apertured straps 186 are disposable on the innermost and outermost end portions of the rockshaft 176. Each of the straps 184 and 186 is apertured so as to receive pivots 188 which, being carried or connected with the several brackets 152—154, serve to connect the straps 184 and 186 to the brackets and thereby serve to hold the rockshaft 176 in position. Preferably, the pivots 188 are in the form of stud bolts which are screwed into the threaded openings 174 in the brackets 152—154 and held in position by lock nuts 187. The pivots 188 also serve to connect generally rearwardly extending upper links 189 to the brackets 152—154, the links 189 extending generally parallel to the lower pairs of arms 166, 167.

Pivotally connected to the rear ends of the upper links 189 and the lower pairs of rigidly interconnected arms 166 and 167 are two pairs of generally vertically disposed standards 191. The several standards are substantially identical with the standards 51 and 52 described above, each standard 191 including laterally spaced apart generally L-shaped bars 192 and 193, held in spaced-apart relation, so as to receive the rear ends of the links 189 and the arms 166, 167, by a lug disposed between each pair of bars 192 and 193. Pivots 195 and 196 serve to connect the rear ends of the links and arms to the vertical portions of the standard bars 192 and 193, and the lower portions of the latter are provided with generally horizontally extending sections 197 which carry substantially the same spread bar clamping means as the standards described above in connection with Figures 1 and 2. The pivots 195 and 196 are of the quick-detachable type and provide for the ready disconnection of the standards 191 so as to permit positioning the latter with the horizontal extensions disposed either forwardly or rearwardly, according to the type of tools to be connected to the spread-bar-receiving clamps. The latter are of substantially the same construction as described above and include upper and lower studs 198 welded at one end to the extremities of the horizontal bar sections 197, the end of the latter being shaped to provide a V-shaped, horizontally facing notch. The outer ends of the studs 198 are threaded so as to receive nuts by which a clamping cap 199, also having a V-shaped notch, may be fixed to the associated standard. The same tools described above in connection with the form of the invention shown in Figures 1–3 may also be mounted in the horizontal portions of the standards 191 of the four-row attachment frame.

Welded to the inner end portion of the rockshaft 176 is a lift arm 201 which is apertured at its upper end to receive a quick-detachable pin 202 by which the lift pipe 203 of the tractor power lift apparatus may be connected thereto. The clutch-operating arm 185 is also apertured at its upper end to receive a link 204 which extends rearwardly to a seeding drive clutch, but since the latter does not form a part of the present invention disclosure of the same has been omitted from the description.

In using the four-row attachment frame units it is desirable to provide ground-engaging means associated with each laterally outer ground-working unit for determining the operating position of the laterally outer unit independently of the laterally inner unit. Referring now to Figure 5, the standards 191 of the laterally outer lift unit 164 are apertured to provide for the insertion of bolts 211 by which a pair of horizontally extending arms 212 may be rigidly fixed to the laterally outer pair of standards 191. Connected to the forward end of each of the arms 212 is a gauge wheel unit 213, the latter preferably including a gauge wheel 214 and a gauge wheel fork and spindle unit 215, the spindle 217 of which is mounted for rocking movement about a generally vertical axis in a clamp 218 that is fixed to a forward spread bar 219 which is fixed to the forward ends of the arms 212 by suitable clamp means 221. Thus, the gauge wheels 214 control the position of the laterally outer ground-working units. The depth of operation of the laterally inner ground-working units may be controlled by a limit chain 225 which is connected at its lower end in any suitable way to the runner frame or other suitable part of the laterally inner ground-working unit and at its upper end to some convenient point on the tractor, as to an adjacent portion of the bracket 226 which carries the seed and fertilizer hoppers on the tractor. The lift arms 177 and 178 are welded to the rockshaft 176 in such relative positions thereon that the laterally outer arm 177 is displaced angularly about four degrees forward, relative to the laterally inner arm 178. This compensates for torsional deflection in the lifting rockshaft 176 and causes both laterally inner and outer ground-working units to be raised to substantially the same transport position.

While we have shown and described the preferred structure in which the principles of the present invention have been incorporated, it is to be understood that our invention is not to be limited to the exact details, shown and described above, but that, in fact, widely different means may be employed in the practice of the broader aspects of our invention.

What we claim, therefore, and desire to secure by Letters Patent is:

1. In an agricultural implement adapted to be mounted on a tractor: the combination comprising an attachment frame adapted to be attached to the tarctor and including laterally spaced apart bracket means and two pairs of generally parallel vertically spaced links pivotally connected at their forward ends with said bracket means and extending generally rearwardly therefrom, a pair of normally vertically disposed standards, each having at its lower end a portion disposed in a generally horizontal fore-and-aft extending direction, a bar-receiving socket carried at the outer end of each of said fore-and-aft extending portions and each bar-receiving socket facing in a generally fore-and-aft extending direction lying normal to the normally vertical portions of said standards, means for detachably connecting a tool bar in said sockets, and means pivotally connecting the rear ends of said rearwardly extending links to the vertical portions of said standards at points on the latter above said horizontal fore-and-aft extending portions, said pivotal connecting means being detachable and said standards being symmetrical about the generally vertical fore-and-aft extending plane passing through said links, thereby providing for a reverse mounting of said standards, whereby they may be mounted with said bar-receiving sockets disposed to face either forwardly under the lower of said generally parallel links, to receive said bar in the forward position, or rearwardly below the level of but rearwardly of said links, to receive said bar in a rearward position relative to the tractor.

2. In an agricultural implement adapted to be mounted on a tractor: the combination comprising an attachment frame adapted to be attached to the tractor and including laterally spaced apart bracket means and two pairs of generally parallel vertically spaced links pivotally connected at their forward ends with said bracket means and extending generally rearwardly therefrom, a pair of normally vertically disposed standards, each having at its lower end a portion disposed in a generally horizontal fore-and-aft extending direction, each standard comprising a pair of generally flat L-shaped bars disposed with their upper portions on opposite sides of the rear ends of said links and a pair of upper and lower generally fore-and-aft extending studs fixed between said bars at the outer ends of the horizontal portions of said bars, said studs being welded to said L-shaped bars and holding said outer ends of the horizontal portions of said L-shaped bars in link-receiving, spaced apart relation, the outer ends of said horizontal portions being notched between the associated studs to provide tool-bar-receiving means, a tool bar disposed in said notches, a pair of clamping caps removably mounted on said studs and adapted to detachably fix said tool-carrying bar in said notches, and means pivotally connecting the rear ends of said rearwardly extending links to the vertical portions of said standards, said pivotal connecting means being detachable and providing for a reverse mounting of said standards.

3. In an agricultural implement adapted to be mounted on a tractor: the combination comprising an attachment frame adapted to be attached to the tractor and including laterally spaced apart bracket means and two pairs of generally parallel vertically spaced links pivotally connected at their forward ends with said bracket means and extending generally rearwardly therefrom, a pair of normally vertically disposed standards, each having at its lower end a portion disposed in a generally horizontal fore-and-aft extending direction, each standard comprising a pair of generally flat L-shaped bars disposed with their upper portions on opposite sides of the rear ends of said links and means fixed to the outer ends of the horizontal portions of said bars holding said outer ends of the horizontal portions of said L-shaped bars in link-receiving, spaced apart relation, the outer ends of said horizontal portions being notched to provide tool-bar-receiving means, a tool bar disposed in said notches, a pair of clamping caps removably mounted on the outer ends of said horizontal portions and adapted to detachably fix said tool-carrying bar in said notches, and means pivotally connecting the rear ends of said rearwardly extending links to the vertical portions of said standards, said pivotal connecting means being detachable and providing for a reverse mounting of said standards.

4. In an agricultural implement, the combination of a link-receiving tool standard comprising a pair of generally flat bars disposed in spaced apart relation so as to receive said link therebetween, means holding said bars in spaced apart relation, including a pair of generally parallel studs fixed between, and extending generally parallel to the adjacent portions of, said bars so as to hold at least the adjacent portions of the bars in said spaced apart relation, the ends of said bars being notched between said studs to provide tool-bar-receiving means, a tool bar disposed in said notches, and a clamping cap removably mounted on said studs and adapted to detachably fix said tool-carrying bar in said notches.

References Cited in the file of this patent

UNITED STATES PATENTS

| Re. 23,154 | Johnson | Oct. 11, 1949 |
| 2,332,616 | Tuft | Oct. 26, 1943 |
| 2,337,662 | Johnson | Dec. 28, 1943 |
| 2,351,078 | Silver | June 13, 1944 |
| 2,491,153 | Blaydes et al. | Dec. 13, 1949 |
| 2,562,486 | Denning | July 31, 1951 |
| 2,575,801 | Evans | Nov. 20, 1951 |
| 2,616,349 | Lindeman et al. | Nov. 14, 1952 |
| 2,683,405 | Wiemerslage | July 13, 1954 |

FOREIGN PATENTS

| 549,114 | Great Britain | Nov. 6, 1942 |